June 28, 1960
G. SMITH
2,943,285
POSITION MEASURING DEVICE
Filed March 14, 1958
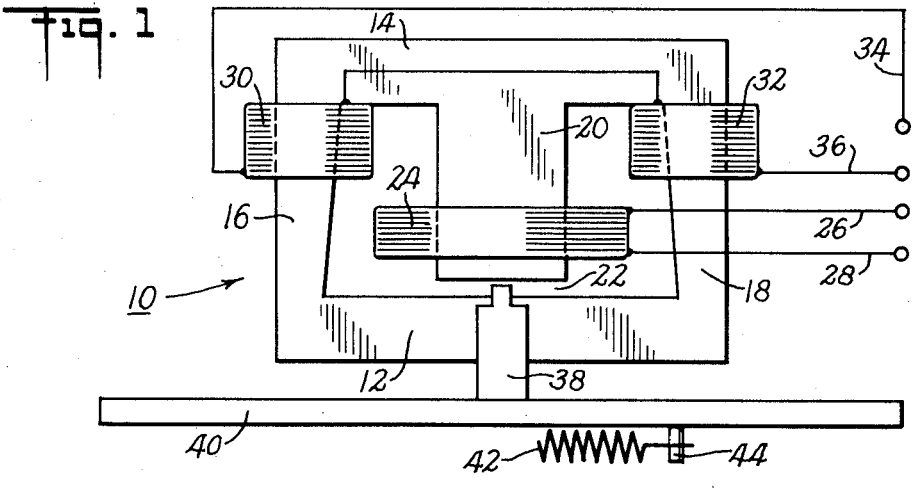
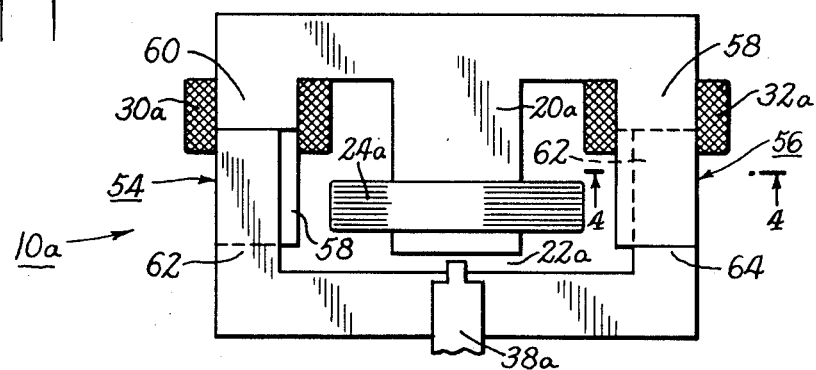
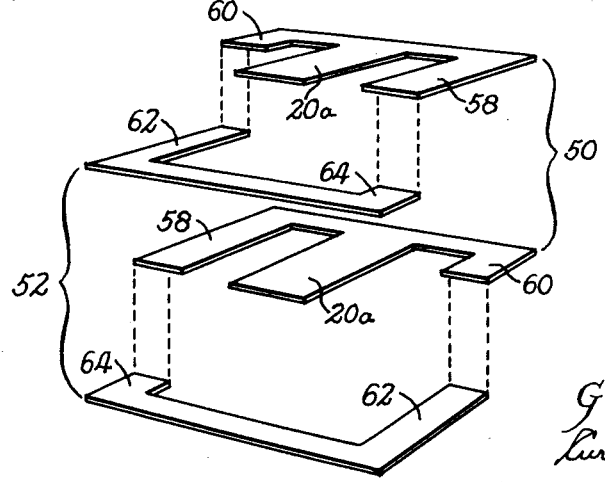
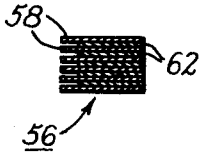
INVENTOR
Graydon Smith
BY
Curtis, Morris & Safford
ATTORNEYS

United States Patent Office 2,943,285
Patented June 28, 1960

2,943,285

POSITION MEASURING DEVICE

Graydon Smith, Concord, Mass., assignor to Graydon Smith Products Corporation, West Concord, Mass.

Filed Mar. 14, 1958, Ser. No. 721,444

11 Claims. (Cl. 336—75)

This invention relates to position measuring devices, and more particularly to devices adapted to produce an electrical signal which varies in accordance with changes in the positioning of a movable element. This invention represents, in one aspect thereof, an improvement to the measuring device disclosed in copending application Serial No. 586,031, filed May 21, 1956.

In such devices, a movably-mounted "flux-barrier" controls the relative distribution of alternating magnetic flux between two magnetic circuit paths having a common core portion. Typically, the device comprises a three-legged magnetic core formed of ferromagnetic material, with the central leg interrupted to form an air-gap within which the flux-barrier is arranged to move.

Briefly, the theory of operation is as follows: Flux is produced by a primary winding surrounding the central leg, and secondary windings on the two outer legs develop signals responsive to the amount of flux passing respectively through these outer legs. The secondary windings normally are connected in series-opposition so that, when the flux-barrier is positioned in the center of the air-gap and the flux produced by the primary winding is essentially evenly divided between the two outer legs, the individual secondary voltages will cancel to produce a "null" or zero output. As the flux-barrier is moved away from this position, the flux passing through the secondary windings is correspondingly unbalanced, with the result that the net voltage produced by the secondary windings has a finite value directly related to the position of the flux-barrier.

Devices of this type have proven to be well adapted for making position measurements in a wide variety of industrial applications, particularly because of the stability and positional linearity of the output signal produced. However, as mentioned in the above-identified application, when attempts have been made to employ such devices in applications requiring very high precision, some difficulties have been encountered due to the presence of small but measurable background signals in the output. These residual background signals are not wholly subject to control by the positioning of the flux-barrier and result, for example, in an imperfect cancellation of the individual secondary voltages when the barrier is in the center of the air-gap. Also, these background signals make it difficult to obtain a satisfactory null when the combined secondary voltages are balanced against an unknown voltage, e.g. as in industrial instrumentation systems.

In the invention described in the above-mentioned copending application, improved results are obtained by offsetting the primary winding with respect to the two secondary windings. In accordance with the present invention to be described hereinbelow in more detail, a further substantial improvement is obtained by shaping the outer legs in such a manner that the portions of these legs opposite the air-gap are farther away from the central leg than the remaining portions of the outer legs. In this way, the reluctance of the leakage flux paths not crossing the air-gap is considerably increased, thus assuring that a larger portion of the flux crosses the air-gap to be controlled by the flux-barrier. In addition, this arrangement makes it possible to use a primary winding that is radially larger and axially smaller (i.e. "pancake-shaped"), thereby further reducing the non-controlled leakage flux coupling between the primary and secondary windings by increasing the spacing between these windings. This construction also provides more efficient utilization of the core material, since the cross-sectional area of the core is more nearly proportioned to the amount of flux passing through it at any given point, thereby minimizing the possibilities of signal distortion due to the non-linear permeability characteristic of the core material.

Accordingly, it is an object of the present invention to provide position measuring apparatus of the general type described that is superior to such apparatus provided heretofore. It is a further object of this invention to provide such apparatus having substantially reduced background signal effects and adapted to achieve a more nearly perfect balance at the null point. Other objects, aspects and advantages of this invention will be pointed out in, or apparent from, the following description considered together with the accompanying drawings, in which:

Figure 1 is a diagrammatic representation of a position-measuring device constructed in accordance with the present invention;

Figure 2 shows a modified position-measuring device arranged to minimize the passage of flux across lap joints in the magnetic core;

Figure 3 is an exploded perspective view of the laminar plates forming the magnetic core of the device of Figure 2; and Figure 4 is a section taken along line 4—4 of Figure 2.

Referring now to Figure 1 of the drawings, there is shown a position-measuring device comprising a magnetic core generally indicated at 10 and formed of ferro-magnetic material, such as transformer iron, arranged in overlapping laminations. This core includes a base member 12 which is joined to a parallel top member 14 by two parallel outer legs 16 and 18. Extending downwardly from the top member is a central leg 20 which is interrupted at its lower extremity to form an air-gap 22 between its lower end and the base member 12. The two outer legs 16 and 18 are tapered smoothly from top to bottom, with the result that the lower portions of these legs (i.e. opposite the air-gap 22) are farther away from the central leg 20 than are the upper outer leg portions.

Wound around the lower end portion of the central leg 20 is a pancake-shaped primary winding 24 which extends out radially a greater distance than the usual primary winding employed with devices of this type. The primary winding 24 has the same number of turns as the usual primary winding, however, and thus has a relatively smaller axial length. This winding is supplied with alternating current through a pair of lead-in wires 26 and 28 connected, for example, to an oscillator or similar energizing source (not shown). Surrounding the upper portion of each of the outer legs 16 and 18, respectively are two identical secondary windings 30 and 32. These windings are connected in series opposition, and through a pair of output wires 34 and 36 to a conventional voltage measuring device (not shown) such as a voltmeter or the equivalent.

Surrounding the base member 12 of the magnetic core 10 is a flux-barrier 38 which comprises a conductive ring of non-magnetic material such as copper. This flux-barrier is secured to a slide 40 which is arranged for horizontal movement to shift the position of the flux-barrier back and forth parallel to the axis of the base member 12. The slide, in turn, is adapted to be connected to an element the positioning of which it is desired to measure. A bias spring 42 secured to a small pin 44 depending from the underside of the slide is provided to constantly urge the flux-barrier in a left-hand direction (referring to the drawing).

The alternating flux induced in the central leg 20 by the current flowing in the primary winding 24 passes through either or both of two principal magnetic paths. One path extends from the central leg across the air-gap 22 into the base member 12 and thence through the left-hand outer leg 16 and through the top portion 14 of the core back to the central leg. The other path extends from the central leg across the air-gap 22 through the base member 12 and thence through the right-hand outer leg 18 and through the top portion back to the central leg. It will be apparent that these two paths include a common portion comprising the central leg 20 and the air-gap 22.

The shorted-turn formed by the flux-barrier 38, as is well known, tends to prevent any change in flux passing therethrough and hence it serves to prevent the passage of any appreciable amount of alternating flux through the base member 12 at the position of the flux-barrier. Accordingly, movement of the flux-barrier to the right or left along the base member provides control over the relative division of flux between the left and right-hand outer legs 16 and 18 respectively. If the flux-barrier is positioned in the horizontal center of the air-gap 22 (that is, midway between the right-hand and left-hand edges of the air-gap), the flux produced by the primary winding 24 will be divided essentially equally between the left and right-hand legs 16 and 18 respectively. In this condition, the voltages produced by the secondary windings 30 and 32 will be essentially equal and opposite in phase, so that the net voltage across the output circuit represented by the output leads 34 and 36 will be very nearly zero.

If the flux-barrier 38 is displaced in either direction from its central position, the relative division of flux in the two outer legs 16 and 18 will be changed. For example, if the flux-barrier moves towards the right-hand leg 18, the area of the air-gap 22 to the right of the flux-barrier will be reduced, while the area of the air-gap to the left of the flux-barrier will be increased. Since effectively no flux can pass through the flux-barrier, a greater portion of the flux developed in the central leg 20 by the primary winding 24 will pass through the left-hand leg 16 than through the right-hand leg 18, and accordingly the voltage induced in the left-hand secondary winding 30 will be relatively increased while that induced in the right-hand secondary winding 32 will be relatively decreased. Consequently, a net voltage will appear in the output circuit represented by the output leads 34 and 36, and this voltage will be directly related to the positioning of the flux-barrier 38.

One problem with devices of this general character is that residual background signals are produced by unbalanced coupling between the primary and secondary windings resulting from flux linkages which do not pass across the working air-gap and which therefore are not controlled by the positioning of the flux-barrier. Such non-controlled flux linkages may amount to as much as 50% of the total flux produced by the primary winding, so it will be apparent that only a small unbalance is required to produce a disturbing background signal. As mentioned in the above-identified copending application, such residual background signals can be reduced by offsetting the primary and secondary windings in such a way as to minimize the coupling therebetween due to such non-controlled flux linkages.

A still further and substantial improvement is effected by the construction outlined above, wherein the outer legs 16 and 18 are tapered from top to bottom with the width of the outer legs being smaller in the portions thereof opposite the primary winding 24, i.e. adjacent the air-gap 22. By so constructing the magnetic core, the amount of stray flux linkages by-passing the air-gap is materially reduced because the distance over which these flux linkages must travel between the central leg 20 and the outer legs has been increased relative to the other paths over which the flux travels. Consequently, there is a reduction in the unbalanced background signals caused by this stray flux. Furthermore, there is a corresponding increase in the amount of flux crossing the air-gap, so that more flux is available for control by the flux-barrier 38. In addition, since the amount of flux at the top of the outer legs is greater than at the bottom, and varies gradually along these outer legs, this tapered leg arrangement assures efficient utilization of the magnetic core material because the cross-sectional area at any given point is proportioned to the amount of flux passing through the leg at that point.

Referring now to Figure 2, there is shown a position-measuring device generally similar to the device of Figure 1 but wherein the magnetic core 10a is formed of a relatively large number of special matched sets 50 and 52 of thin laminar plates such as shown in Figure 3. These plates are interleaved together in reverse fashion to form a core stack having lap joints in the outer leg regions generally indicated at 54 and 56. One set of these plates 50 define the central leg 20a of the core, on which the primary winding 24a is wound.

Generally, lap joints in the outer legs of the type of device referred to herein tend to cause unbalanced background signals because the magnetic characteristics of the two lap joints cannot as a practical matter readily be made identical. However, this difficulty is materially alleviated in the construction shown in Figures 2 and 3. In this embodiment, the outer leg sections 58 and 60 of one set of the laminar plates 50 are equal in width, but are wider than the corresponding equal-width outer leg sections 62 and 64 of the other set of plates 52. Also, the outer leg sections 58 are positioned closer to the central leg 20a than the sections 62, and the sections 58 extend only part way down towards the base member 12a of the core, i.e. these sections terminate short of the regions laterally adjacent the air-gap 22a.

With this arrangement, the stray flux from the central leg tends more to enter the outer leg sections 58 than the adjacent outer leg sections 62, because the reluctance of the paths to the latter sections is considerably higher than the reluctance of the paths to the former. Consequently, substantially less of the stray flux passes across the lap joints 54 and 56 between the plates 50 and 52, and there is a corresponding reduction in the unbalanced background signal resulting from the unequal magnetic characteristics of the two lap joints.

Although several preferred embodiments of the invention have been set forth in detail, it is desired to emphasize that these are not intended to be exhaustive or necessarily limitative; on the contrary, the showing herein is for the purpose of illustrating the invention and thus to enable others skilled in the art to adapt the invention in such ways as meet the requirements of particular applications, it being understood that various modifications may be made without departing from the scope of the invention as limited by the prior art.

I claim:

1. Position-responsive apparatus comprising, in combination, a magnetic core structure forming first and second magnetic paths and having a portion common to both of said paths, said structure including elongated base and top members joined at the ends thereof by a pair of outer legs, said structure also having a central leg fixedly positioned relative to said members and extending between said top member and said base member to form the said common core portion for said two magnetic circuits, air-gap means in said magnetic structure and arranged to couple said central leg to said two outer legs, said air-gap means comprising an interruption in said central leg, a movable flux-barrier comprising a closed loop of non-magnetic electrically-conductive material positioned to extend into said air-gap means and to move therealong to vary the relative magnetic coupling between said central leg and said outer legs respectively, a primary winding wound on said central leg, a pair of secondary windings wound on said magnetic structure and inductively coupled respectively to said first and second magnetic circuits in regions thereof remote from said central leg, the portions of said outer legs that are opposite said air-gap means interruption being farther away from said central leg than the portions of said outer legs that are remote from said interruption, and an output circuit connected to said secondary windings.

2. Position-responsive apparatus comprising, in combination, a magnetic structure forming first and second magnetic circuits and including a base member and a top member joined at the ends thereof by a pair of outer legs, said structure also having a central leg extending between the center portion of said top member and the center portion of said base member to form a common core portion for said two magnetic circuits, means including air-gap means in said magnetic structure arranged to couple said central leg to said two outer legs, a movable flux-barrier comprising a closed loop of non-magnetic electrically-conductive material positioned to extend into said air-gap means and to move therealong to vary the relative magnetic coupling between said central leg and said outer legs respectively, a primary winding wound on one end of said central leg and extending only part way along said central leg, the width of said outer legs in the portions thereof opposite said primary winding being less than the width of the remaining portions of said outer legs, said first-mentioned outer leg portions being farther away from said central leg than said remaining outer leg portions, a pair of secondary windings wound on said magnetic structure and inductively coupled respectively to said first and second magnetic circuits in regions thereof remote from said central leg, the center of said primary winding being substantially offset from a line joining the centers of said secondary windings, and an output circuit connected to said secondary windings.

3. Position-responsive apparatus comprising, in combination, a three-legged magnetic structure forming first and second magnetic circuits and including a base member and a top member joined at the ends thereof by a pair of outer legs, said structure also having a central leg fixedly positioned relative to said members, said central leg extending generally parallel to said outer legs and between said top member and said base member to form a common core portion for said two magnetic circuits, air-gap means comprising an interruption in said central leg, a movable flux-barrier comprising a closed loop of non-magnetic electrically-conductive material positioned to extend into said air-gap means and to move therealong to vary the relative magnetic coupling between said central leg and said outer legs respectively, a primary winding wound on said central leg closely adjacent said air-gap means and extending only part way along said central leg, the width of said outer legs in the portions thereof opposite said primary winding being less than the width of the remaining portions of said outer legs, said first-mentioned outer leg portions being farther away from said central leg than said remaining outer leg portions, a pair of secondary windings wound on said magnetic structure and inductively coupled respectively to said first and second magnetic circuits in regions thereof remote from said central leg, the center of said primary winding being substantially offset from a line joining the centers of said secondary windings, and an output circuit connected to said secondary windings.

4. Position-responsive apparatus comprising, in combination, a three-legged magnetic structure forming first and second magnetic circuits and including a base member and a top member joined at the ends thereof by a pair of outer legs, said structure also having a central leg fixedly positioned relative to said members and extending between the center portion of said top member and the center portion of said base member to form a common core portion for said two magnetic circuits, air-gap means comprising an interruption in said central leg adjacent said base member, a movable flux-barrier comprising a closed loop of non-magnetic electrically-conductive material positioned to extend into said air-gap and to move therealong to vary the relative magnetic coupling between said central leg and said outer legs respectively, a pancake-shaped primary winding wound on the portion of said central leg immediately adjacent said air-gap means and on the side of said air-gap means that is remote from said base member, said primary winding extending only part way along said central leg towards said top member, said outer legs being tapered in width from said top member towards said base member so that the portions of said outer legs opposite said primary winding are relatively narrower, said outer leg portions being farther away from said center leg than the remaining portions of said outer legs, a pair of secondary windings wound on said outer legs respectively and closely adjacent the regions of joinder between said outer legs and said top member, the center of said primary winding being substantially offset from a line joining the centers of said secondary windings, and an output circuit connected to said secondary windings.

5. Apparatus as claimed in claim 4, wherein said primary winding is located in a region wholly outside the space between said secondary windings.

6. Position-responsive apparatus comprising, in combination, a magnetic core structure forming first and second magnetic paths and having a portion common to both of said paths, said structure including elongated base and top members joined at the ends thereof by a pair of outer legs, said structure also having a central leg fixedly positioned relative to said members and extending between said top member and said base member to form the said common core portion for said two magnetic circuits, air-gap means in said magnetic structure and arranged to couple said central leg to said two outer legs, said air-gap means comprising an interruption in said central leg, a movable flux-barrier comprising a closed loop of non-magnetic electrically-conductive material positioned to extend into said air-gap means and to move therealong to vary the relative magnetic coupling between said central leg and said outer legs respectively, a primary winding wound on said central leg, a pair of secondary windings wound on said magnetic structure and inductively coupled respectively to said first and second magnetic circuits in regions thereof remote from said central leg, said magnetic core structure comprising matched sets of thin laminar plates stacked together with lap joints in said outer legs, one of said sets including magnetic material defining the part of said central leg on which said primary winding is wound, the outer leg sections of said one set of plates being positioned closer to said central leg than the outer leg sections of said other set of plates, whereby to reduce the stray flux passing across said lap joints, and an output circuit connected to said secondary windings.

7. Apparatus as claimed in claim 6, wherein the outer leg sections of said one set of plates extend only part way along said outer legs and terminate short of the region laterally adjacent said air-gap means interruption in said central leg.

8. Apparatus as claimed in claim 7, wherein the outer leg sections of said one set of plates terminate short of the region laterally adjacent said primary winding.

9. Apparatus as claimed in claim 8, wherein said air-gap means interruption in said central leg is immediately adjacent said base member, said one set of laminar plates defining said top member and sections of said outer legs.

10. Apparatus as claimed in claim 6, wherein the outer leg sections of said one set of plates are wider than the outer leg sections of the other set of said plates.

11. Position-measuring apparatus comprising a three-legged magnetic core structure forming first and second magnetic circuits and having a portion common to both of said circuits, said core stucture being provided with air-gap means in series with both of said magnetic circuits, primary winding means on said core structure to produce flux in both of said magnetic circuits, secondary winding means coupled to said core structure to produce an output voltage corresponding to the relative division of flux between said two circuits, a movable flux-barrier comprising a closed loop of non-magnetic electrically-conductive material extending into said air-gap means and shiftable therethrough to vary the relative division of said flux between said two circuits, said magnetic core structure comprising matched sets of thin laminar plates stacked together and each having sections to define said legs, said sets of plates being arranged to form lap joints in at least one of said legs that is remote from said air-gap means, one of said sets of plates also including magnetic material defining a part of the core structure that is immediately adjacent said air-gap means, the sections of said one set which define said one leg being closer to said part of said core structure than the sections of the other set which define said one leg, whereby to minimize the passage of stray flux across said lap joints.

References Cited in the file of this patent
UNITED STATES PATENTS

| | | |
|---|---|---|
| 2,116,119 | Lowenstein | May 3, 1938 |
| 2,432,948 | Thompson | Dec. 16, 1947 |
| 2,631,272 | Smith | Mar. 10, 1953 |